United States Patent [19]

Martin

[11] 4,312,993

[45] Jan. 26, 1982

[54] SILYLATED POLYETHERS

[75] Inventor: Eugene R. Martin, Onsted, Mich.

[73] Assignee: SWS Silicones Corporation, Adrian, Mich.

[21] Appl. No.: 74,188

[22] Filed: Sep. 10, 1979

[51] Int. Cl.$^3$ .................................................. C07F 7/10
[52] U.S. Cl. .................................. 556/419; 556/423;
260/404; 260/404.5; 427/387; 427/394;
427/396; 427/412; 428/224; 106/287.11;
427/372.2; 427/430.1; 427/443.1
[58] Field of Search ................ 556/423, 419; 260/404, 260/404.5

[56] References Cited

U.S. PATENT DOCUMENTS 3,694,480  9/1972  Omietanski ..................... 556/423 X
4,088,670  5/1978  Bargain et al. .................. 556/419 X

*Primary Examiner*—Paul F. Shaver

[57] ABSTRACT

Silylated polyethers having the general formula:

$$\begin{array}{l} CH_2(OC_nH_{2n})_xRA_b \\ [CH(OC_nH_{2n})_xRA_c]_a \\ CH_2(OC_nH_{2n})_xRA_d \end{array}$$

wherein at least one R is selected from the group consisting of an —NH radical, an ammonium radical or a radical of the formula $$-O\overset{O}{\overset{\|}{C}}-R^1-\overset{O}{\overset{\|}{C}}-O^{\ominus},$$
$$-O\overset{O}{\overset{\|}{C}}-R^1-\overset{O}{\overset{\|}{C}}O-, \text{ or}$$
$$-O\overset{O}{\overset{\|}{C}}-R^1-\overset{O}{\overset{\|}{C}}-,$$

in which the radicals are linked to the polyether through an ester, amine, amide or ammonium radical and the remaining R groups are selected from hydrocarbonoxy radicals having up to 18 carbon atoms, hydroxyl radicals or a radical of the formula $$-O\overset{O}{\overset{\|}{C}}-R^1-\overset{O}{\overset{\|}{C}}O-H,$$

R$^1$ is a divalent hydrocarbon radical selected from the group consisting of —(CH$_2$)$_y$, —CH=CH—, or a cyclic radical selected from the group consisting of C$_6$H$_4$, C$_6$H$_8$ and C$_{10}$H$_6$; A is a silicon containing radical selected from the group consisting of cationic or anionic radicals of the formula or $$R^4-\overset{R_e^3}{\underset{|}{Si}}(OR^2)_{3-e},$$

$$R^4-\overset{R_e^3}{\underset{|}{Si}} O_{\frac{3-e}{2}}$$

and nonionic radicals of the formula $$R^5-\overset{R_e^3}{\underset{|}{Si}}(OR^2)_{3-e}$$

$$R^5-\overset{R_e^3}{\underset{|}{Si}} O_{\frac{3-e}{2}},$$

wherein R$^2$ and R$^3$ which may be the same or different, are monovalent hydrocarbon radicals having from 1 to 18 carbon atoms, R$^4$ is an ionic radical linked to a silicon atom consisting of hydrogen, carbon, oxygen and nitrogen atoms selected from the formulas $$\overset{\oplus}{N}H_3-R^6-, \overset{\oplus}{N}H_3-R^6-\overset{\oplus}{N}H_2R^6-, \overset{\oplus}{N}H_3-R^6-NHR^6-,$$

$$\overset{\ominus}{O}\overset{O}{\overset{\|}{C}}-R^1-\overset{O}{\overset{\|}{C}}-NH-R^6-\overset{|}{\underset{|}{N}}-R^6-, \overset{O}{\overset{\|}{O}}C-R^1-\overset{O}{\overset{\|}{C}}\overset{\ominus\oplus}{O}NH_3R^6-,$$

$$\begin{array}{c} C=O \\ | \\ R^1 \\ | \\ C=O \\ | \\ O^{\ominus} \end{array}$$

$$\overset{\ominus}{O}\overset{O}{\overset{\|}{C}}-R^1-\overset{O}{\overset{\|}{C}}-NHR^6- \text{ and } \overset{\ominus}{O}\overset{O}{\overset{\|}{C}}-R^1-\overset{O}{\overset{\|}{C}}-NHR^6-NHR^6-,$$

in which R$^5$ is a nonionic radical consisting of carbon, hydrogen, oxygen and nitrogen atoms selected from the formulas $$-NH-R^6-\overset{|}{\underset{|}{N}}-R^6, -NH-R^6-NH-R^6-, -NH-R^6,$$

$$-\overset{O}{\overset{\|}{C}}-R^1-\overset{O}{\overset{\|}{C}}-NH-R^6-, -\overset{O}{\overset{\|}{C}}-R^1-\overset{O}{\overset{\|}{C}}-NH-R^6-\overset{|}{\underset{|}{N}}-R^6,$$

$$\begin{array}{c} C=O \\ | \\ R^1 \\ | \\ C=O \\ | \end{array}$$

$$-\overset{O}{\overset{\|}{C}}-R-\overset{O}{\overset{\|}{C}}-NH-R^6-NHR^6-$$

and when R is an —NH radical, then R$^5$ may be a divalent hydrocarbon radical and R$^6$ is a radical having from 1 to 10 carbon atoms selected from the group consisting of a saturated divalent hydrocarbon radical, a divalent hydrocarbonoxy radical in which the oxygen is in the form of an ether linkage and an unsaturated divalent hydrocarbon radical in which the unsatisfied valences are linked to a silicon atom, and when R is cationic, then A must be anionic, and when R is anionic, then A must be cationic and when R is nonionic then A must be nonionic, a is a number of from 0 to 4, b, c and d are each numbers of from 0 to 1, the sum of b, c and d must be 1 when A is a monovalent radical and 0.5 when A is a divalent radical and when b, c or d are O, then R must be a hydroxyl or hydrocarbonoxy radical or a radical of the formula

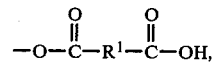

e is a number of from O to 2, n is 2, 3 or 4, x is a number of at least 1 and up to 600, preferably from 10 to 250 and y is a number of from 0 to 8. These silylated polyethers may be used to treat textile materials to impart hydrophilic finishes thereon.

19 Claims, No Drawings

SILYLATED POLYETHERS

The present invention relates to silylated polyethers, and more particularly to a process for preparing silylated polyethers. Also, this invention relates to textile materials coated with silylated polyethers and to a process for coating the same.

BACKGROUND OF INVENTION

Heretofore textile materials have been treated with compositions containing a hydroxyl terminated organopolysiloxane, a crosslinking agent and a catalyst to impart a soft silky durable hand thereto. (See U.S. Pat. Nos. 3,876,459 to Burrill and 3,770,489 to Richardson.) Although treatment with these organpolysiloxanes has been very effective for the intended purpose, it has also imparted certain undesirable properties to the treated materials. For example, textile materials treated with organopolysiloxanes tend to soil more readily. Moreover, organopolysiloxanes have a tendency to impart hydrophobic properties to textile materials treated therewith, which in turn decreases the comfort of the material. Furthermore, organopolysiloxanes are generally applied to textile materials in the form of emulsions and these emulsions have a tendency to separate during application, thereby resulting in a non-uniform coating. When these coated textile materials are then subjected to further treatment, such as dyeing or printing, the uneven distribution of organopolysiloxanes on the surface of the textile materials interferes with the print and dye quality of the material. Another disadvantage of organopolysiloxanes is that they generally require more than one component, and once the components have been mixed, the resultant composition is of limited stability.

Silicon containing materials which have been used to impart soil-repellent and soil-release properties to textile materials are described in U.S. Pat. Nos. 3,716,517 and 3,716,518 to Pittman et al. These silicon containing materials are prepared by copolymerizing at least one monomer capable of imparting oleophobic properties with at least one monomer capable of imparting hydrophilic properties. The oleophobic monomer is a silane which contains a terminal perfluoroalkyl group of from 3 to 18 perfluorinated carbon atoms. The hydrophilic monomer is a silane which contains two or more alkylene oxide groups in which the alkylene groups contain from 2 to 6 carbon atoms. These hydrophilic monomers are prepared by converting a monoetherified polyalkyleneoxy glycol to the corresponding allyl ether by reacting with allyl bromide in the presence of a base and thereafter reacting the intermediate reaction product with a silane containing hydrogen in the presence of a platinum catalyst. Where it is desired to produce monomers containing an ester linkage, the monoetherified polyethyleneoxy glycol is esterified with acryloyl chloride and then a hydrogen containing silane and platinum catalyst is added to the resultant intermediate.

In preparing the hydrophilic monomers described above, one essential ingredient is terminally unsaturated polyethers which are not readily available in commercial quantities. These terminally unsaturated polyethers may be prepared by reacting monoetherified polyalkyleneoxy glycols with allyl chloride. Furthermore, the silicon compounds described by Pittman et al, contain an ester group, whereas the silylated polyethers of the present invention contain amine or ester-amide or ester-ammonium or diester linkages.

Therefore, one of the advantages of this invention is that the silylated polyethers of this invention use materials which are readily available such as polyoxyalkylene glycols and aminofunctional silanes. Another advantage of the silylated polyethers of this invention is that these silylated polyethers will crosslink to form hydrophilic coatings on textile materials treated therewith. The hydrophilic property improves the comfort of textile materials by wicking away body perspiration. Furthermore the silylated polyethers of this invention impart softness to textile materials treated therewith which offset the harsh hand imparted to textile materials treated with aminoplast resins. Also, it has been found that the silylated polyethers of this invention will extend the aminoplast resins and in certain applications may replace the aminoplast resins.

Therefore, it is an object of this invention to provide silylated polyethers. Another object of this invention is to provide silylated polyethers which may be applied to textile materials to impart a soft silky hand and good resistance to soil redeposition. Still another object of this invention is to provide silylated polyethers which may be applied to textile materials to impart hydrophilic properties thereto. A further object of this invention is to provide silylated polyethers which are water soluble and will not separate before and/or during application to textile materials. A still further object of this invention is to provide a single component, water soluble, stable silicon containing composition for treating textile materials.

SUMMARY OF THE INVENTION

The foregoing objects and others which will become apparent from the following description are accomplished in accordance with this invention, generally speaking, by providing silylated polyethers having the general formula $$\begin{array}{c} CH_2(OC_nH_{2n})_xRA_b \\ | \\ [CH(OC_nH_{2n})_xRA_c]_a \\ | \\ CH_2(OC_nH_{2n})_xRA_d \end{array}$$

wherein at least one R is selected from the group consisting of an -NH radical, an ammonium radical or a radical of the formula

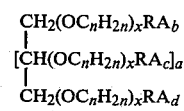

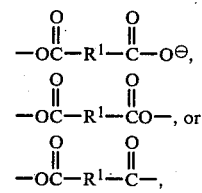

in which the radicals are linked to the polyether through an ester, amine, amide or ammonium radical and the remaining R groups are selected from hydrocarbonoxy radicals having up to 18 carbon atoms, hydroxyl radicals or a radical of the formula

$R^1$ is a divalent hydrocarbon radical selected from the group consisting of $-(CH_2)_y-$, $-CH=CH-$, or a cyclic radical selected from the group consisting of $C_6H_4$, $C_6H_8$ and $C_{10}H_6$; A is a silicon containing radical selected from the group consisting of cationic or anionic radicals of the formula

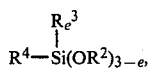

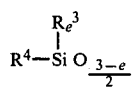

and nonionic radicals of the formula

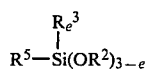

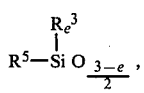

wherein $R^2$ and $R^3$ which may be the same or different, are monovalent hydrocarbon radicals having from 1 to 18 carbon atoms, $R^4$ is an ionic radical linked to a silicon atom consisting of hydrogen, carbon, oxygen and nitrogen atoms selected from the formulas

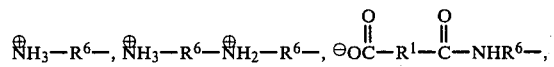

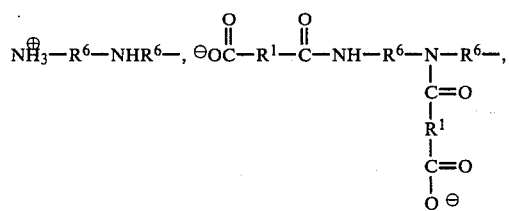

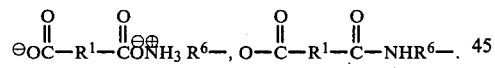

in which $R^5$ is a nonionic radical consisting of carbon, hydrogen, oxygen and nitrogen atoms selected from the formulas

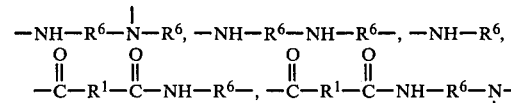

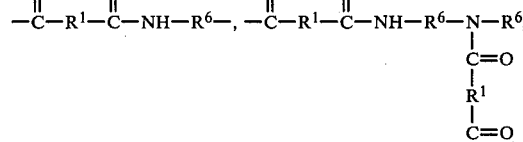

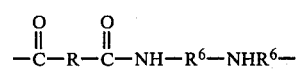

and when R is an -NH radical, then $R^5$ may be a divalent hydrocarbon radical and $R^6$ is a radical having from 1 to 10 carbon atoms selected from the group consisting of a saturated divalent hydrocarbon radical, a divalent hydrocarbonoxy radical in which the oxygen is in the form of an ether linkage and an unsaturated divalent hydrocarbon radical in which the unsatisfied valences are linked to a silicon atom. The unsatisfied valences of A are satisfied by R and when A is a divalent radical, the ratio of A to R is 1:2 and when R is cationic, then A must be anionic, and when R is anionic, then A must be cationic and when R is nonionic then A must be nonionic, a is a number of from 0 to 4, b, c and d are each numbers of from 0 to 1, the sum of b, c and d must be at least 1, and when b, c or d are 0, then R must be a hydroxyl or hydrocarbonoxy radical or a radical of the formula

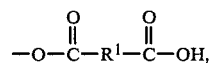

e is a number of from 0 to 2, n is 2, 3, or 4, x is a number of at least 1 and up to 600, preferably from 10 to 250 and y is a number of from 0 to 8. These silylated polyethers may be applied to textile materials to form a hydrophilic coating thereon.

DETAILED DESCRIPTION

Suitable examples of silicon containing materials represented by A above are

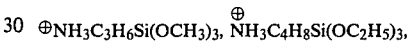

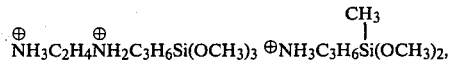

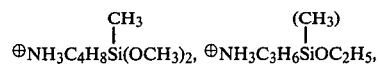

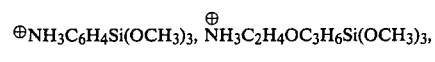

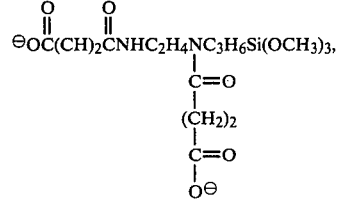

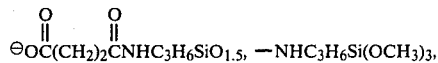

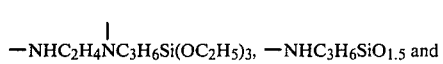

The unsatisfied valences of the silicon atoms in the above formulas are satisfied by silicon-oxygen-silicon linkages.

Suitable examples of hydrocarbonoxy radicals represented by R having from 1 to 18 carbon atoms are methoxy, ethoxy, propoxy, butoxy, octoxy, dodecoxy and octadecoxy radicals. Examples of suitable radicals represented by $R^1$ are divalent hydrocarbon radicals having from 1 to 10 carbon atoms are methylene, ethylene, trimethylene, tetramethylene, pentamethylene, hexamethylene, octamethylene and decamethylene radicals.

with a mono cyclic anhydride at a temperature of from 80° to 185° C. to form a half ester which is then reacted with an aminofunctional silane having at least 1 and up to 3 alkoxy groups per silicon atom at from 0° to 110° C.

The reaction described above may be further illustrated by the following equations:

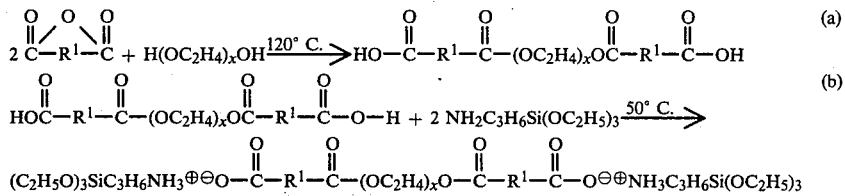

Examples of divalent cyclic radicals represented by $R^1$ are phenylene, naphthenylene and cyclohexenylene radicals.

Suitable examples of monovalent hydrocarbon radicals represented by $R^2$ and $R^3$ are alkyl radicals, e.g., methyl, ethyl, propyl, butyl, hexyl, octyl, decyl, dodecyl and octadecyl radicals; aryl radicals, e.g., the phenyl radical; alkaryl radicals, e.g., tolyl, xylyl and ethylphe- A second method for preparing the silylated ethers of this invention is to react an aminofunctional silane with a mono cyclic anhydride at a temperature of from 25° to 110° C. to form a carboxylic acid functional silane and thereafter reacting the resultant silane with amine terminated oxyalkylene polymer or copolymers thereof at a temperature of from 0° to 110° C. This method is further illustrated by the following equations:

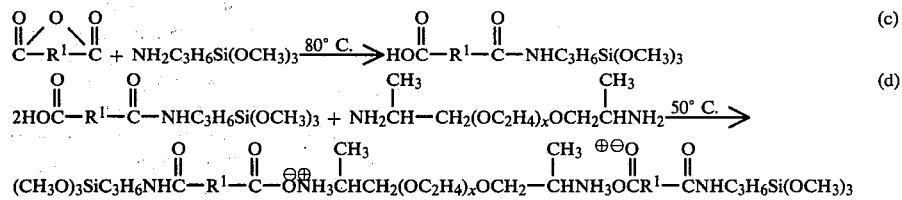

nyl radicals; cycloalkyl radicals, e.g., cyclobutyl, cyclohexyl, cyclodecyl radicals; aralkyl radicals, e.g., benzyl, 2-phenylethyl, 2-phenylpropyl.

Examples of suitable divalent radicals represented by $R^6$ are hydrocarbon radicals such as ethylene, trimethylene, hexamethylene, octamethylene; hydrocarbonoxy containing radicals of the formula

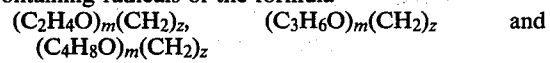

where m is from 1 to 50, and z is a number of from 1 to 10, ethylene oxide, trimethylene oxide, tetramethylene oxide and polymers and copolymers thereof and alkenylene radicals such as vinylene, propenylene, butenylene, hexenylene and the like.

The silylated polyethers of this invention may be prepared by several different techniques. Some of the techniques for preparing these silylated polyethers are described herein below.

One method for preparing the silylated polyethers is to react oxyalkylene glycols or copolymers thereof In the methods described above, if the reactants in equations (b) and (d) are heated up to about 115° C., the resultant product is an ammonium salt. When an amido linkage is desired, then the reactants are heated at temperatures above 115° C.; however, the by-product, water, will hydrolyze the alkoxy groups on the silicon atom, thereby resulting in the formation of a crosslinked network.

A third method for preparing silylated polyethers is to react an amine terminated oxyalkylene polymer or copolymers thereof with a cyclic anhydride to form a carboxylic acid functional polymer which is then reacted with an aminofunctional silane at a temperature of from 0° to 110° C. This method is further illustrated by the equations:

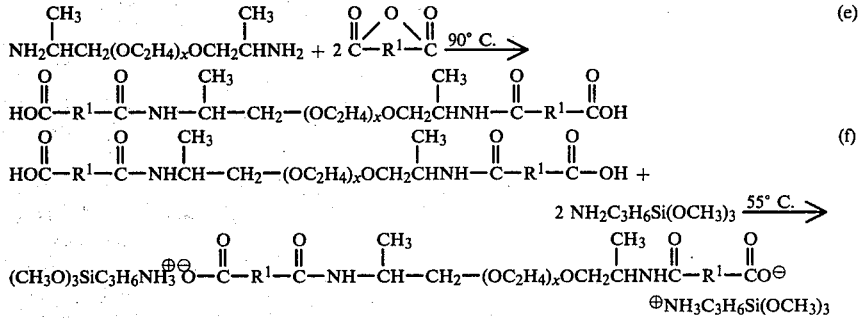

A fourth method for preparing the silylated polyethers of this invention is to react an oxyalkylene glycol or copolymers thereof with a cyclic anhydride and thereafter reacting the resultant carboxylic acid polymer with a haloalkylalkoxysilane in the presence of triethylamine at a temperature of from 80° to 150° C.

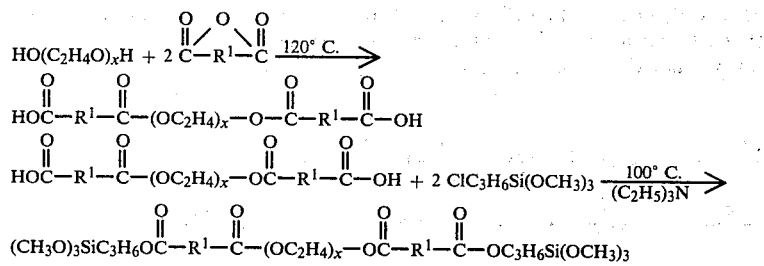

A fifth method for preparing silylated polyethers is to react an amine terminated oxyalkylene polymer or copolymers thereof with a haloalkylalkoxysilane and thereafter reacting the resultant product with a sodium alkoxide at a temperature of from about 80° to 150° C.

This method is illustrated by the following equations:

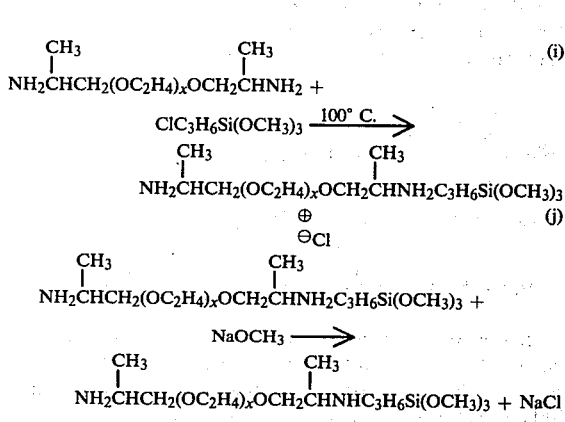

wherein R and x are the same as above.

The silylated polyethers of this invention may also be prepared by substituting dicarboxylic acids having up to 10 carbon atoms for the cyclic anhydrides described above.

When dicarboxylic acids are used, it may be advantageous to employ an esterification catalyst such as titanates, alkali metal hydroxides and mineral acids.

Suitable example of dicarboxylic acids which may be used are oxalic acid, malonic acid, succinic acid, glutaric acid, adipic acid, pimelic acid, suberic acid, azelaic acid and sebacic acid.

The oxyalkylene glycols and copolymers thereof which are used to make the compositions of this invention are well known in the art. These glycol polymers and copolymers may be illustrated by the following formula:

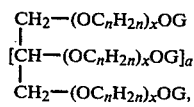

where G is hydrogen or an alkyl radical having from 1 to 18 carbon atoms, in which at least one G must be hydrogen and n is 2, 3 or 4, x is a number of at least 1 and up to 600, preferably from 10 to 250. Generally, these polymers are made by the homopolymerization or copolymerization of ethylene oxide and propylene oxide using various alcohols as initiators. Examples of alcohols are glycerine, methanol, ethylene glycol, ethanol t-butanol and the like.

Suitable examples of cyclic anhydrides that may be used to make the compositions of this invention are succinic anhydride, glutaconic anhydride, maleic anhydride, 1,2-cyclohexanedicarboxylic anhydride, 1-cyclohexane-1,2-dicarboxylic anhydride, 3-cyclohexene-1, 2-dicarboxylic anhydride, 4-cyclohexene-1, 2 dicarboxylic anhydride, 1, 8-naphthalic acid anhydride and phthalic anhydride.

Suitable examples of aminofunctional silanes which may be used to prepare the compositions of this invention are beta-aminopropyltriethoxysilane, gamma-aminopropyltrimethoxysilane, methyl-beta-(aminoethyl)-gamma-aminopropyldimethoxysilane, omega-aminohexyltributoxysilane, beta-(aminoethoxy)propyltrimethoxysilane, beta-(aminoethoxy)hexyltriethoxysilane, beta-(aminopropoxy)butyltributoxysilane,

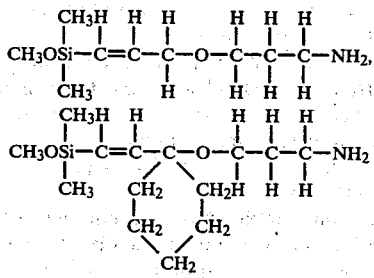

and the like.

Examples of amine terminated oxyalkylene homopolymers and copolymers which may be used to prepare the compositions of this invention are those having the general formula

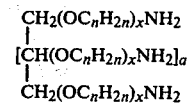

wherein a, n and x are the same as above. It is preferred that at least one $OC_3H_6$ group be present and that the amine group be linked to the $OC_3H_6$ group. These polymers can be synthesized by effecting the amination of the corresponding oxyalkylene homopolymer or copolymer having terminal haloalkyl groups. These haloalkyl terminated polymers may be prepared by reacting oxyalkylene glycol or copolymers thereof with a phosphorus trihalide.

The haloalkyl silanes that may be used in the preparation of the silylated polyethers may be represented by the formula

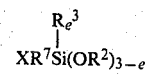

wherein $R^2$, $R^3$ and e are the same as above, $R^7$ is a divalent hydrocarbon radical having from 1 to 18 carbon atoms, and X is a halogen such as chlorine, bromine and iodine.

Suitable examples of divalent hydrocarbon radicals represented by $R^7$ are ethylene, trimethylene, tetramethylene, hexamethylene, octamethylene, dodecamethylene, hexadecamethylene and octadecamethylene radicals.

More specifically, suitable examples of haloalkysilanes that may be used are chloropropyltrimethoxysilane, chloropropylmethyldimethoxysilane, chloropropyldimethylethoxysilane, bromopropyltriethoxysilane, iodobutylmethyldimethoxysilane, bromobutylethyldimethoxysilane and the like.

A crosslinked network is formed by heating the ionic salts described above to form the corresponding amide and the water formed as a by-product, hydrolyzes the alkoxy group linked to the silicon atom to cause crosslinking thereof.

In the above reactions, the mole ratio of cyclic anhydride to amine or hydroxyl groups linked to the polyether or silane may be varied over a wide range. For example, the mole ratio of cyclic anhydride to amine or hydroxyl group may range from 0.17:1 to 1.25:1 with the preferred ratio of cyclic anhydride to amine or hydroxyl groups being from 0.33:1 to 1.1:1, with the proviso that at least one amine or hydroxyl group per molecule is reacted with the cyclic anhydride.

In the subsequent silylation of the polyethers, the mole ratio of the carboxylic acid radical formed from the reaction of the cyclic anhydride with the above amine or hydroxyl groups to the haloalkyl radicals linked to the silane or the amine groups linked to the silane or polyether may range from 0.17:1 to 1.25:1 with the proviso that at least one carboxylic acid radical per molecule is present for each amine group in order that an ammonium salt or the corresponding amide or the ester is formed.

The silylated polyethers of this invention can be applied to textile materials in admixture with other substances which have heretofore been used to impart certain properties to textile materials. Other substances which may be used in combination with the silylated polyethers are lubricating agents, agents which impart abrasion resistance to the treated fibers, materials which improve the fragrance of the treated materials, antistatic lubricants, fabric softeners, fire retardants, soil resistant materials and crease proofing agents. Examples of crease proofing agents are aminoplast resins such as urea-formaldehyde resins, melamine-formaldehyde resins, and dimethylol dihydroxy ethylene urea which may contain magnesium chloride and zinc nitrate as catalysts. Other crease-proofing resins are phenol-formaldehyde resins and hydroxyethyl methacrylate.

The silylated polyethers of this invention may be applied in concentrated form or as an aqueous solution or in the form of dispersions in water or in organic solvents such as di-n-butylether, aromatic hydrocarbons, and/or chlorinated hydrocarbons.

These silylated polyethers possess a variety of outstanding properties. By way of illustration they can be prepared so that they are soluble in water. Also, they can be prepared so that they are water insoluble, but are easily emulsified or dispersed in water without the aid of an emulsifying or dispersing agent.

The amount of silylated polyethers dissolved or dispersed in water may vary over a wide range. Generally, the amount of silylated polyether present in an aqueous solution or dispersion may range from about 0.25 to 99 percent, preferably from about 1 to 60 percent and more preferably from about 2 to 50 percent by weight based on the weight of the silylated polyether and solvent.

The silylated polyethers of this invention, and if desired other substances, may be applied to all textile materials, preferably organic textile materials on which organopolysiloxanes have been or could have been applied heretofore. Examples of such textile materials are wool, cotton, rayon, hemp, natural silk, polypropylene, polyethylene, polyester, polyurethane, polyamide, cellulose acetate, polyacrylonitrile fibers, and mixtures of such fibers. The textile materials may consist of staple fibers or monofilaments.

The silylated polyethers of this invention and other substances, if desired, may be applied to the textile materials by any means known in the art, such as by spraying, immersion, coating, calendering or by gliding the fibers across a base which has been saturated with the silylated polyethers of this invention and other materials, if desired.

Generally, the solids add-on is in the range of from 0.025 to 20 percent and preferably from about 0.05 to 10 percent, based on the weight of the original textile material.

After the textile material has been treated, it is dried at an elevated temperature, e.g., from about 50° to 200° C. for a brief period of time, e.g., from about 3 to 15 minutes.

The treated textile material should contain from about 0.025 to about 10 percent by weight on a dry basis of the cured composition of this invention.

Textile materials treated with the silylated polyethers of this invention possess all of the properties common to prior art textile materials, such as soft hand, with the additional property of being durably hydrophilic and soil resistant.

Specific embodiments of this invention are further illustrated in the following examples in which all parts are by weight unless otherwise specified.

EXAMPLE 1

A mixture containing about 500 parts (0.19 mole) of an oxyethylene-oxypropylene triol copolymer having a weight ratio of oxyethylene to oxypropylene of about 1 to 1 and a molecular weight of about 2600 and about 50 parts (0.5 mole) of succinic anhydride are heated in a nitrogen atmosphere for 6 hours at 100° C. and then the temperature is increased to 150° C. and heated for an additional 7 hours. A sample is withdrawn and analyzed by infrared analysis for the presence of anhydride groups. No anhydride groups are detected in the product. The reaction product is cooled to 60° C. and about 110.5 parts (0.5 mole of aminopropyltriethoxysilane are added to the product and mixed for two hours. Subsequent Nuclear Magnetic Resonance and Infrared analyses indicate a product having the formula

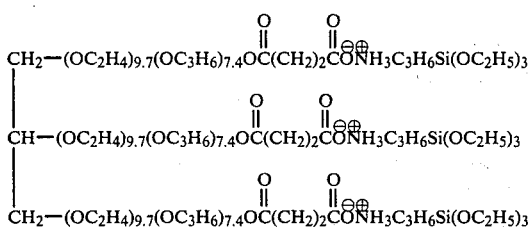

The product is a water soluble amber liquid. Water solutions of the polymer formed a friable rubber-like film upon evaporation.

EXAMPLE 2

A mixture containing about 2,000 parts (0.35 mole) of an oxyethylene-oxypropylene triol copolymer having a mole ratio of oxyethylene units to oxypropylene units of about 3.6 to 1 with a molecular weight of about 5,660 and about 106.1 parts (1.06 moles) of succinic anhydride are heated at about 175° C. for eighteen hours. The resultant product has a viscosity of 4,168 cs. at 25° C. Nuclear Magnetic Resonance analysis shows a mole ratio of the functional groups as follows:

| Functional Group | Mole Ratio |
| --- | --- |
| $C_3H_6O$ | 1.0 |
| $C_2H_4O$ | 3.88 |

The acid content is found to be about 0.58 milliequivalent of acid per gram while the theoretical value is 0.5 milliequivalent per gram. The product is represented by the formula

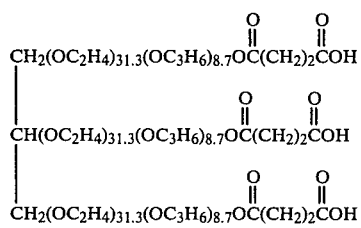

About 900 parts of the above product are mixed for 1 hour with about 90.1 parts aminopropyltriethoxysilane. A slight exotherm is observed. The resultant product is a dark straw colored liquid having a viscosity of 24,460 cs. at 25° C. It is water soluble and an aqueous solution of the polymer formed a friable rubber-like film when the water is allowed to evaporate at room temperature. The crosslinked product has the following formula in which the unsatisfied valences of the silicon atoms are satisfied by other silicon atoms through an oxygen linkage.

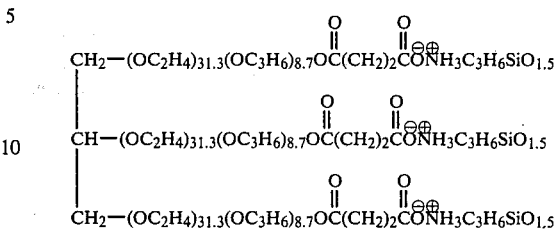

EXAMPLE 3

A mixture containing about 400 parts of polyoxyethylene diol having a molecular weight of 400 and 200 parts of succinic anhydride are heated to 175° C. with agitation. It is then cooled to 90° C. and a sample analyzed by Infrared. The analysis indicates a product having the formula

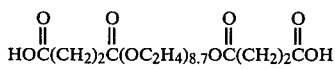

About 442 parts of 3-aminopropyltriethoxysilane are added to the product, heated to 90° C. for two hours and then cooled to room temperature. Nuclear Magnetic Resonance and Infrared analyses show a product having the formula

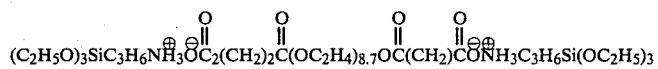

The product is a water soluble viscous amber colored liquid. An aqueous solution of the polymer formed a friable rubber-like film when the water is allowed to evaporate at room temperature. The resultant crosslinked film is insoluble in water.

EXAMPLE 4

A mixture containing 1,000 parts (0.38 mole) of an oxyethylene-oxypropylene triol copolymer having a molecular weight of about 2600, with a weight ratio of oxyethylene to oxypropylene of about 1 to 1, and about a 150.3 parts (1.5 moles) of succinic anhydride are heated to 170° C. for twelve hours. The resultant product is cooled to room temperature, then about 166.5 parts (0.75 mole) of 2-amino ethyl-3-aminopropyltrimethoxysilane are added and mixed for one hour, during which time the temperature increases to 50° C. A straw-colored liquid is obtained which has a viscosity of 23,584 cs. at 25° C. Nuclear Magnetic Resonance and Infrared analysis show that the composition has the following formula

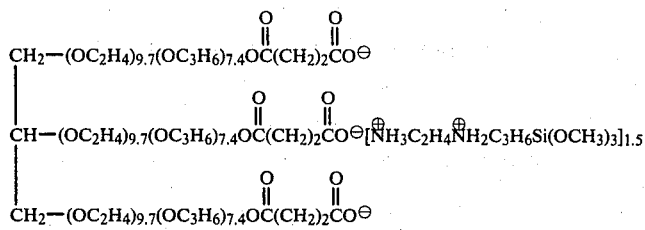

The product is water soluble and when the water is removed from the aqueous solution by evaporation, a friable rubber-like film is obtained.

EXAMPLE 5

A mixture containing about 650 parts (0.25 mole) of an oxyethylene-oxypropylene triol copolymer having a molecular weight of 2600 and about 25 parts, (0.25 mole) of succinic anhydride are heated to 170° C. The resultant product is cooled to room temperature and about 55.3 parts (0.25 mole) of aminopropyltriethoxysilane are added with agitation. A slight exotherm is observed. Subsequent analysis by Nuclear Magnetic Resonance and Infrared show a product having the general formula

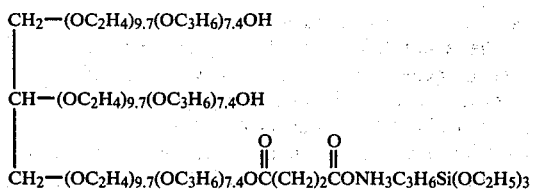

The product has a viscosity of 3,118 cs. at 25° C. and a pH of 7.57. An aqueous solution of the product cures to a gellatinous film when the water is allowed to evaporate at room temperature.

EXAMPLE 6

A mixture containing about 1300 parts (0.5 mole) of an oxyethylene-oxypropylene triol copolymer having a molecular weight of about 2600 and about 150 parts of succinic anhydride are heated in accordance with the procedure described in Example 2. The resultant product is cooled to room temperature and about 110.5 parts (0.5 mole) of aminopropyltriethoxysilane are added with agitation. A slight exotherm is observed.

Nuclear Magnetic Resonance and Infrared analyses show a product having the following formula

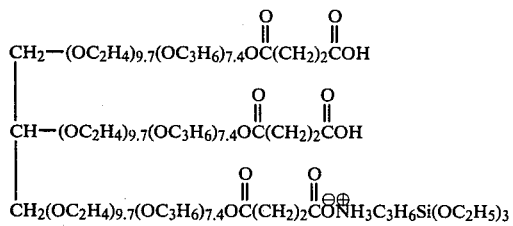

The product is found to have an acid equivalent of 0.6 milliequivalent of acid per gram.

EXAMPLE 7

About 222 parts of aminopropyltriethoxysilane and about 100 parts of succinic anhydride are mixed together and the resulting exotherm heated the mixture to about 110° C. The mixture is agitated for 2 hours and then cooled to room temperature. A clear yellow liquid is obtained having a viscosity of 521.9 cs. and an acid content of 2.7 milliequivalents per gram (theoretical 3.1). Infrared analysis shows that the succinic anhydride has reacted and that a silane containing a carboxylic acid group is formed.

About 75 parts of the resultant product and 139.8 parts of an amine terminated polyether having the formula

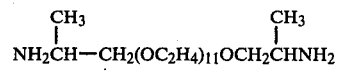

are mixed together.

The temperature of the reaction mixture increases to 50° C. The reactants are agitated for two hours and then cooled to ambient temperature. A clear yellow fluid is obtained having a viscosity of 764.7 cs. at 25° C. A portion of the composition is dissolved in water and then the water is evaporated in an oven at 182° C. A heterogenous film consisting of a liquid phase and a friable rubber is obtained indicating that all the polyether molecules are not silylated. The product consists of a mixture of unreacted amine terminated polyether and silylated polyethers of the formulas

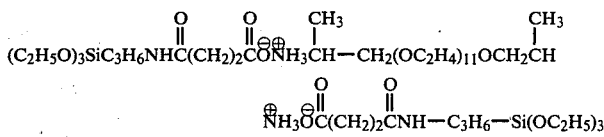

and

EXAMPLE 8

About 100 parts of the silane containing the carboxylic acid groups prepared in accordance with the procedure of Example 7 and 93.6 parts of the amine terminated polyether of Example 7 are mixed together in a reaction vessel. The temperature of the reaction vessel increases to about 45° C. as a result of the exotherm. A yellow, slightly cloudy liquid having a viscosity of 5,039 cs. at 25° C. is obtained. A portion of the reaction mixture is dissolved in water and the water evaporated off in an oven at 172° C. A rubber-like film is obtained, indicating that silylation is complete. The resultant product is represented by the following formula

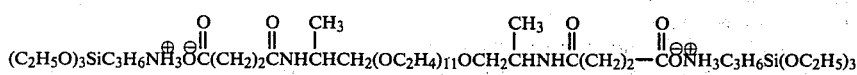

EXAMPLE 9

About 187.2 parts of the amine terminated polyether of Example 7 and 62 parts of succinic anhydride are mixed together in a reaction vessel. The temperature increases to about 110° C. as a result of the exotherm. A yellow liquid is obtained having a viscosity of 14,310 cs. at 25° C. and an acid content of 2.6 milliequivalents per gram. Infrared analysis shows that a carboxylic acid group is formed. About 124.6 parts of the resultant carboxylic acid containing polymer are mixed with about 69 parts of aminopropyltriethoxysilane and as a result of the exotherm, the temperature of the reactants increases to 75° C. A yellow liquid having a viscosity of 23,814 cs. at 25° C. is obtained. A portion of the composition is dissolved in water and the water evaporated off in an oven at 172° C. A rubber-like film is obtained, which shows that silylation has occurred. The product is represented by the following formula

EXAMPLE 10

A mixture containing about 19.9 parts of 3-chloropropyl trimethoxysilane, 100 parts of methanol, and 200 parts of an amine terminated oxyethylene-oxypropylene copolymer of the formula

are refluxed in a reaction vessel for four hours. After four hours, about 21.6 parts of a solution consisting of 25 percent sodium methoxide and 75 percent methanol are added. The reaction vessel is cooled to ambient temperature and the by-product sodium chloride removed by filtration. The volatile constituents are then removed in vacuum. A clear yellow wax having a melting range of from 42°–45° C. and an elemental silicon content of 1.06 percent is obtained. The composition is represented by the formula

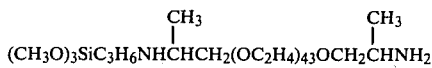

EXAMPLE 11

A mixture containing about 100.1 parts of succinic anhydride and 375 parts of a polyoxypropylene glycol having a molecular weight of 750 is heated to 170° C. in a reaction vessel and then cooled to 50° C. About 221 parts of aminopropyltriethoxysilane are then added and agitated for two hours. A yellow liquid having a viscosity of 11,373 cs. at 25° C. is obtained. A portion of the product is added to water and the mixture readily separates into two layers. The water is evaporated off in an oven at 172° C. A friable-rubber film is obtained which shows that the polyether has been silylated.

EXAMPLE 12

A mixture containing about 106.1 parts of succinic anhydride and 2000 parts of oxyethylene-oxypropylene triol copolymer, having a molecular weight of 6360 and a weight ratio of oxyethylene to oxypropylene of 7 to 3 is heated at 175° C. for eighteen hours in a reaction vessel. The resultant product is a yellow liquid having a viscosity of 4,168 cs. at 25° C. and an acid content of 0.58 milliequivalent per gram (theoretical 0.5).

About 258.6 parts of the above product are mixed with 29.8 parts of chloropropyltrimethoxysilane, 15.2 parts of triethylamine and 100 parts of toluene and refluxed for nine hours. A white solid by-product is removed by filtration which is identified as triethylamine hydrochloride.

The volatiles are then vacuum stripped off, yielding a brown, taffy-like liquid having a viscosity of 29,347 cs. at 25° C. A portion of the resultant product is dissolved in water and the water evaporated off in an oven at 172° C. A friable-rubber film is formed which shows that a silylated product is obtained.

EXAMPLE 13

The procedure of Example 1 is repeated except that 74 parts of phthalic anhydride are substituted for the succinic anhydride. An amber liquid having a viscosity of 17,887 cs. at 25° C. is obtained. The resultant product is represented by the following formula

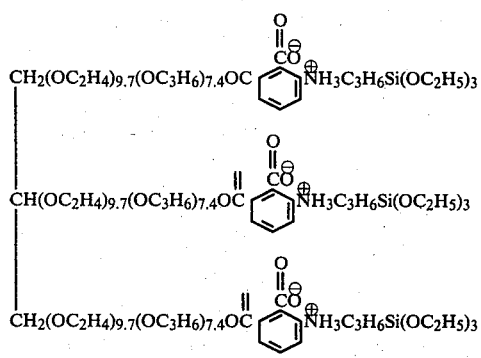

When the product is hydrolyzed, a friable-rubber film is formed.

EXAMPLE 14

The procedure of Example 1 is repeated except that 19 parts of maleic anhydride is substituted for the succinic anhydride. An amber liquid having a viscosity of 84,470 cs. at 25° C. is obtained. The resultant product is represented by the formula

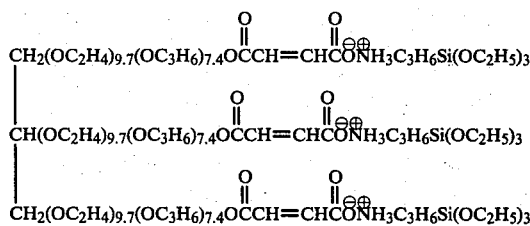

When the product is hydrolyzed, a friable-rubber film is obtained.

Comparison Example V₁

The carboxylic acid containing oxyethylene-oxypropylene copolymers of Example 12 are dissolved in water and then the water is evaporated off at 172° C. In a similar experiment, the glycol functional oxyethylene-oxypropylene copolymers of Example 12 are dissolved in water and the water evaporated off at 172° C. In both experiments a liquid product is obtained. These experiments show that the polyether must be silylated in order to obtain a crosslinked network.

EXAMPLE 15

A textile fabric containing a mixture of Dacron and cotton (65/35) is treated with the silylated polyethers of this invention by dipping the fabric in aqueous solutions containing 0.7 percent by weight of the various compositions prepared in the Examples and 1.7 percent by weight of dimethyol dihydroxy ethylene urea in which the percent by weight is based on the total weight of the solution. The fabric is then dried for two minutes at 70° C. in a forced air oven. The hydrophilic properties of the fabric are evaluated in accordance with the procedure described in the AATCC Test Method 39-1977 "Wettability: Evaluation of". Each fabric is then laundered once and the properties reevaluated. Table I shows the results of these tests.

Comparison Example V₂

A textile fabric containing a mixture of Dacron-cotton (65/35) is treated with an aqueous solution containing 1.7 percent of dimethyol dihydroxy ethylene urea in accordance with the procedure described in Example 15. The treated fabric has a harsh stiff hand. The results of the tests are shown in the following Table.

TABLE I

| Example No. | Wetting times, (sec.) | | | | |
|---|---|---|---|---|---|
| | Initial | 1 Wash | 2 Washes | 3 Washes | 4 Washes | 5 Washes |
| 1 | 4 | 5 | 7 | 7 | 9 | 11 |
| 2 | | 4 | 5 | 7 | 7 | 8 |
| 4 | 4 | 7 | 10 | 12 | 14 | 24 |
| 13 | | 13 | 8 | 9 | 12 | 13 |
| 14 | | 8 | 7 | 10 | 11 | 11 |
| Comparison Example V₂ | | 10 | 11 | — | — | — |

EXAMPLE 16

The procedure of Example 15 is repeated except that a Dacron fabric is treated with aqueous solutions containing 5 percent by weight based on the weight of the aqueous solutions of the compositions described in the Examples. The dimethyol dihydroxy ethylene urea is omitted from the aqueous solutions. The following table shows the results of these tests.

| Example No. | Initial Wetting Time | Wetting Time After 1 Wash |
|---|---|---|
| None | 10 min. | 10 min. |
| 7 | 2 sec. | 35 sec. |
| 8 | 2 sec. | 17 sec. |
| 10 | 6 sec. | 20 sec. |
| 14 | 3 sec. | 3 sec. |

The above table shows that each of the compositions impart hydrophilic properties to the treated fabric and after one wash have a soft, silky hand.

EXAMPLE 17

Other fabrics, including cotton, wool, nylon, and rayon are treated with the composition of Example 1 in accordance with the procedure described in Example 15. Fabrics haveing hydrophilic properties and a soft, silky hand are obtained.

What is claimed is:
1. Silylated polyethers of the general formula

$$\begin{array}{l}CH_2(OC_nH_{2n})_xRA_b\\ |\\ [CH(OC_nH_{2n})_xRA_c]_a\\ |\\ CH_2(OC_nH_{2n})_xRA_d\end{array}$$

in which at least one R is selected from the group consisting of an —NH radical, an ammonium radical and a radical selected from the group consisting of

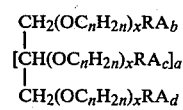

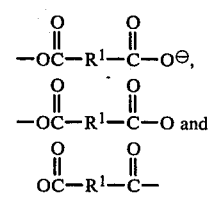

wherein the radicals are linked to the polyether through a group selected from the class consisting of an ester, amine, amide and ammonium radical and the remaining R's are selected from the group consisting of hydroxyl, hydrocarbonoxy radicals having up to 18 carbon atoms and a radical of the formula

$R^1$ is a divalent hydrocarbon radical selected from the group consisting of $(-CH_2)_y$, $-CH=CH-$ and a cyclic radical selected from the group consisting of $C_6H_4$, $C_6H_8$ and $C_{10}H_6$; A is a silicon containing radical selected from the group consisting of cationic and anionic radicals of the formula

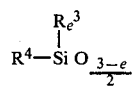

and nonionic radicals of the formula

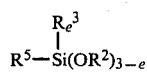

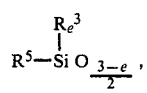

in which $R^2$ and $R^3$ are monovalent hydrocarbon radicals having from 1 to 18 carbon atoms, $R^4$ is an ionic radical linked to a silicon atom consisting of carbon, hydrogen, oxygen and nitrogen atoms which is selected from the group consisting of

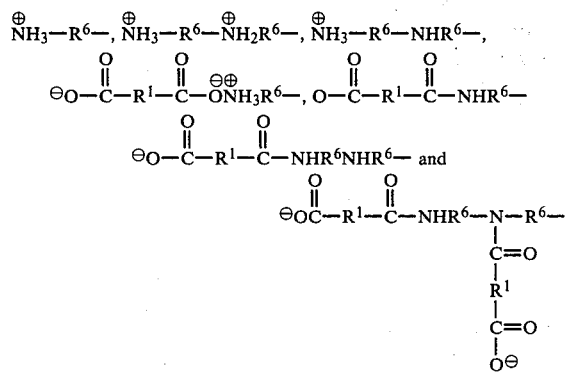

$R^5$ is a nonionic radical consisting of carbon, hydrogen, oxygen and nitrogen atoms which is selected from the group consisting of

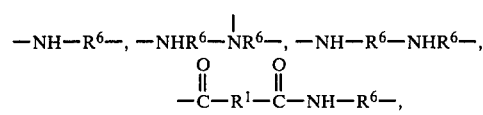

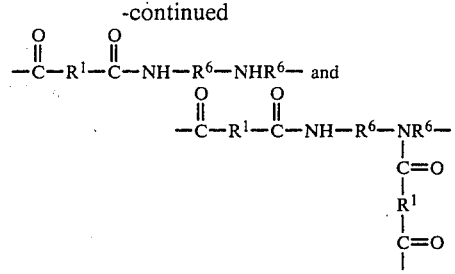

and when R is an $-NH$ radical, $R^5$ may be a divalent radical, $R^6$ is a radical linked to a silicon atom having from 1 to 10 carbon atoms selected from the group consisting of a saturated divalent hydrocarbon radical, a divalent hydrocarbonoxy radical in which the oxygen is in the form of an ether linkage and an unsaturated divalent hydrocarbon radical, in which the unsatisfied valences are linked to a silicon atom and the unsatisfied valences of A are satisfied by R and when A is a divalent radical, the ratio of A to R is 1:2 and when R is cationic, then A must be anionic and when R is anionic, then A must be cationic and when R is nonionic, then A must be nonionic, a is a number of from 0 to 4, b, c and d are each numbers of from 0 to 1 and the sum of b, c and d must be at least 1 and when b, c or d are 0, then R is selected from the group consisting of a hydroxyl, a hydrocarbonoxy radical and a radical of the formula

e is a number of 0 to 2, n is 2, 3 or 4, x is a number of at least 1 and up to 600 and y is a number of from 0 to 8.

2. The silylated polyethers of claim 1, wherein A is a radical of the formula

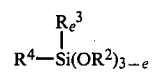

in which $R^2$ and $R^3$ are each monovalent hydrocarbon radicals having from 1 to 18 carbon atoms. $R^4$ is an ionic radical linked to a silicon atom consisting of carbon, hydrogen, oxygen and nitrogen atoms which is selected from

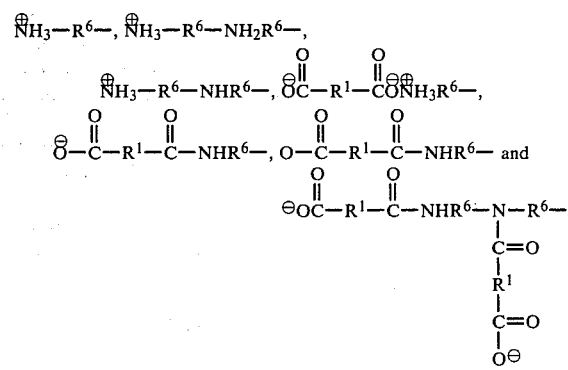

and e is a number of from 0 to 2.

3. The silylated polyethers of claim 1, wherein A is a radical of the formula

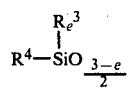

in which $R^3$ is monovalent hydrocarbon radical having from 1 to 18 carbon atoms, $R^4$ is an ionic radical linked to a silicon atom consisting of carbon, hydrogen, oxygen and nitrogen atoms which is selected from

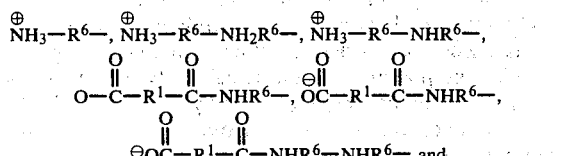

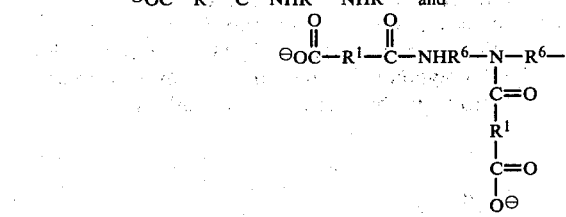

and e is a number of from 0 to 2.

4. The silylated polyethers of claim 1, wherein A is a nonionic silicon containing radical of the formula

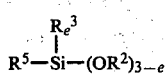

in which $R^2$ and $R^3$ are each monovalent hydrocarbon radicals having from 1 to 18 carbon atoms, $R^5$ is a nonionic radical consisting of carbon, hydrogen, oxygen and nitrogen atoms which is selected from the group consisting of

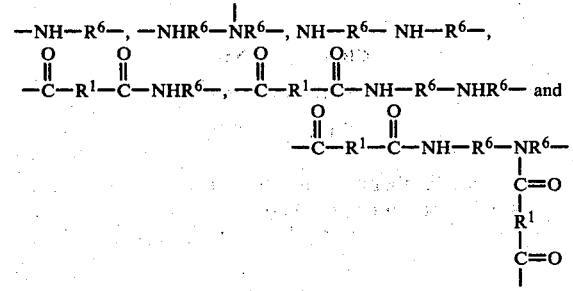

$R^6$ is a radical linked to a silicon atom having from 1 to 10 carbon atoms selected from the group consisting of a saturated divalent hydrocarbon radical, a divalent hydrocarbonoxy radical in which the oxygen is in the form of an ether linkage and an unsaturated divalent hydrocarbon radical and e is a number of from 0 to 2.

5. The silylated polyethers of claim 1, wherein A is a radical of the formula

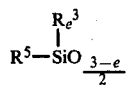

in which $R^3$ is a monovalent hydrocarbon radical having from 1 to 18 carbon atoms, $R^5$ is a nonionic radical consisting of carbon, hydrogen, oxygen and nitrogen atoms which is selected from the group consisting of

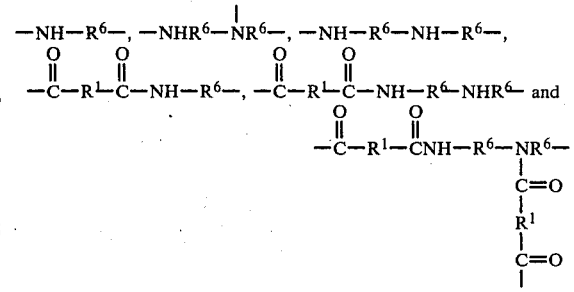

$R^6$ is a radical linked to a silicon atom having from 1 to 10 carbon atoms selected from the group consisting of a saturated divalent hydrocarbon radical, a divalent hydrocarbonoxy radical in which the oxygen is in the form of an ether linkage and an unsaturated divalent hydrocarbon radical and e is a number of from 0 to 2.

6. The silylated polyethers of claim 1, wherein R is an ammonium ion and A is a group of the formula

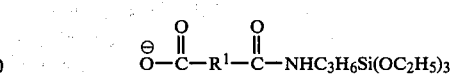

7. The silylated polyethers of claim 1, wherein R is an ammonium ion and A is a group of the formula

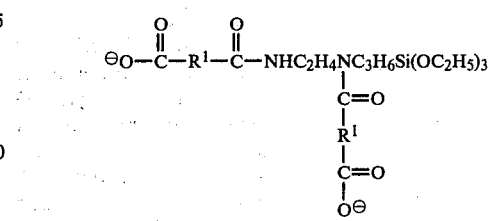

8. A silylated polyether of the formula

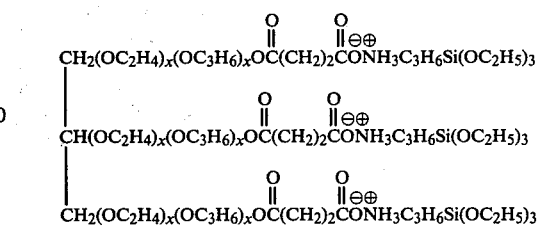

where x is a number of from 1 to 600.

9. A crosslinked silylated polyether of the formula

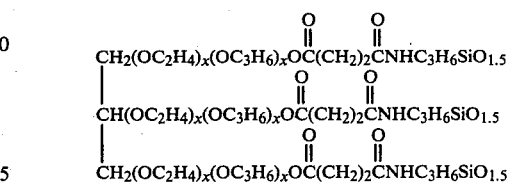

where x is a number of from 1 to 600.

10. A silylated polyether of the formula

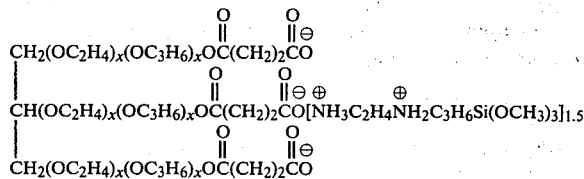

where x is a number of from 1 to 600.

11. A silylated polyether of the formula

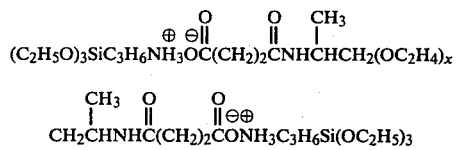

where x is a number of from 1 to 600.

12. A crosslinked silylated polyether of the formula

where x is a number of from 1 to 600.

13. A process for preparing the silylated polyethers of claim 1 which comprises reacting an oxyalkylene glycol with a cyclic anhydride in a mol ratio of cyclic anhydride to hydroxyl group of from 0.33:1 to 1.1:1 at a temperature of from 80° to 185° C. and thereafter reacting the resultant product with an aminofunctional silane having from 1 to 3 alkoxy groups linked to the silicon atom at a temperature of from 0° to 110° C.

14. A process for preparing the silylated polyethers of claim 1 which comprises reacting an aminofunctional silane having from 1 to 3 alkoxy groups linked to the silicon atom with a cyclic anhydride in a mol ratio of cyclic anhydride to amine group of from 0.33:1 to 1.1:1 at a temperature of from 25° to 110° C. and thereafter reacting the resultant product with an amine terminated oxyalkylene polymer at a temperature of from 0° to 110° C.

15. A process for preparing the silylated polyethers of claim 1 which comprises reacting an amine terminated oxyalkylene polymer with a cyclic anhydride in a mol ratio of cyclic anhydride to amine group of from 0.33:1 to 1.1:1 at a temperature of from 25° to 100° C. and thereafter reacting the resultant product with an aminofunctional silane having from 1 to 3 alkoxy groups linked to the silicon atom at a temperature of from 0° to 75° C. in the presence of an acid acceptor.

16. A process for preparing the silylated polyethers of claim 1 which comprises reacting an amine terminated oxyalkylene polymer with a haloalkylalkoxysilane in a mol ratio of about amine to haloalkyl of from 0.17:1 to 1.25:1 and at a temperature of from 25° to 125° C. and thereafter reacting the resultant product with a sodium alkoxide at a temperature of from 80° to 150° C.

17. The process of claims 13, 14, or 15 in which the silylated polyethers are heated to a temperature above 125° C. to form the corresponding amides.

18. The process of claim 13, wherein the oxyalkylene glycols are represented by the formula

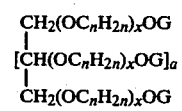

where G is hydrogen or an alkyl group having from 1 to 18 carbon atoms in which at least one G must be hydrogen, a is a number of from 0 to 4, n is a number of from 2 to 4 and x is a number of from 1 to 600.

19. The process of claim 15, wherein the amine terminated oxyalkylene polymer is represented by the formula

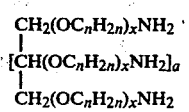

where a is a number of from 0 to 4, n is a number of from 2 to 4 and x is a number of from 1 to 600.

* * * * *

UNITED STATES PATENT AND TRADEMARK OFFICE
CERTIFICATE OF CORRECTION

PATENT NO. : 4,312,993

DATED : January 26, 1982

INVENTOR(S) : Eugene R. Martin

It is certified that error appears in the above-identified patent and that said Letters Patent are hereby corrected as shown below:

Abstract, page 1, column 2, line 16, cancel the formula

" and substitute the formula

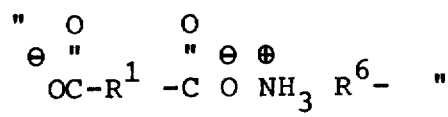

"

Column 3, line 45, cancel the formula

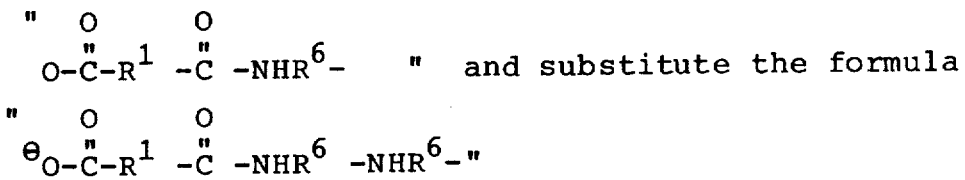

" and substitute the formula $$^{\ominus}O-\overset{O}{\underset{\|}{C}}-R^1 -\overset{O}{\underset{\|}{C}} -NHR^6 -NHR^6-$$"

Column 19, line 48, cancel the formula

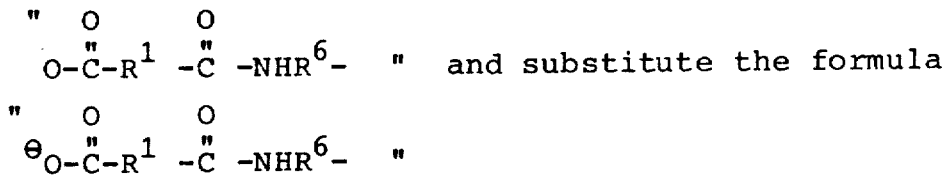

" and substitute the formula $$^{\ominus}O-\overset{O}{\underset{\|}{C}}-R^1 -\overset{O}{\underset{\|}{C}} -NHR^6-$$"

UNITED STATES PATENT AND TRADEMARK OFFICE
CERTIFICATE OF CORRECTION

PATENT NO. : 4,312,993
DATED : January 26, 1982
INVENTOR(S) : Eugene R. Martin

It is certified that error appears in the above-identified patent and that said Letters Patent are hereby corrected as shown below:

Column 20, line 51, cancel the formula

" $^{\oplus}NH_3 - R^6 - NH_2 \ R^6 -$ " and substitute the formula

" $^{\oplus}NH_3 - R^6 \ ^{\oplus}NH_2 \ R^6 -$ "

Column 20, line 56, cancel the formula

" $O - \overset{\overset{O}{\|}}{C} - R^1 - \overset{\overset{O}{\|}}{C} - NHR^6 -$ " and substitute the formula " $^{\ominus}O - \overset{\overset{O}{\|}}{C} - R^1 - \overset{\overset{O}{\|}}{C} - NHR^6 - NHR^6 -$ "

Column 21, line 13, cancel the formula

" $^{\oplus}NH_3 - R^6 - NH_2 R^6 -$ " and substitute the formula

" $^{\oplus}NH_3 - R^6 - \ ^{\oplus}NH_2 R^6 -$ "

UNITED STATES PATENT AND TRADEMARK OFFICE
CERTIFICATE OF CORRECTION

PATENT NO. : 4,312,993
DATED : January 26, 1982
INVENTOR(S) : Eugene R. Martin

Page 3 of 3

It is certified that error appears in the above-identified patent and that said Letters Patent are hereby corrected as shown below:

Column 21, line 15, cancel the formulas

"$O-\overset{O}{\overset{\|}{C}}-R^1 -\overset{O}{\overset{\|}{C}}-NHR^6-$ , $^{\ominus}O\overset{O}{\overset{\|}{C}}-R^1 -\overset{O}{\overset{\|}{C}}-NHR^6-$" and substitute the formulas "$^{\ominus}O-\overset{O}{\overset{\|}{C}}-R^1 -\overset{O}{\overset{\|}{C}}-NHR^6-$ , $^{\ominus}O\overset{O}{\overset{\|}{C}}R'-\overset{O}{\overset{\|}{C}}-O^{\ominus}\ ^{\oplus}NH_3R^6-$"

Signed and Sealed this

Fifth Day of April 1983

[SEAL]

Attest:

GERALD J. MOSSINGHOFF

Attesting Officer

Commissioner of Patents and Trademarks